United States Patent
Wight et al.

(10) Patent No.: US 6,734,955 B2
(45) Date of Patent: May 11, 2004

(54) DISPERSION MEASUREMENT IN OPTICAL NETWORKS

(76) Inventors: Mark Stephen Wight, 31 Fulton Ave., Ottawa, Ontario (CA), K1S 4Y5; Andreas Franz Ludwig Sizmann, 16 Gordon St., Ottawa, Ontario (CA), K1S 4C8; Mei Du, 2299 Stocker La., Scotch Plains, NJ (US) 07076; Alan Glen Solheim, 15 Havenwood Trail, Stittsville, Ontario (CA), K2S 1C9

( * ) Notice: Subject to any disclaimer, the term of this patent is extended or adjusted under 35 U.S.C. 154(b) by 179 days.

(21) Appl. No.: 10/058,948

(22) Filed: Jan. 28, 2002

(65) Prior Publication Data

US 2003/0142293 A1 Jul. 31, 2003

(51) Int. Cl.[7] .............................................. G01N 21/00
(52) U.S. Cl. ..................................................... 356/73.1
(58) Field of Search ................ 356/73.1; 398/173–201, 398/39–99, 110–124, 135, 161

(56) References Cited

U.S. PATENT DOCUMENTS

| | | | | |
|---|---|---|---|---|
| 4,750,833 A | * | 6/1988 | Jones ......................... | 356/73.1 |
| 5,973,816 A | * | 10/1999 | Akiyama et al. ............ | 359/237 |
| 6,456,411 B1 | * | 9/2002 | Ishikawa et al. ............ | 398/192 |
| 6,587,242 B1 | * | 7/2003 | Shake et al. ................. | 398/98 |

OTHER PUBLICATIONS

Senior, John M. "Optical Fiber Communications: Principles and Practice", pp. 196–202.

* cited by examiner

Primary Examiner—Tu T. Nguyen (57) ABSTRACT

A device for measuring dispersion of a link between two switching nodes of an optical network comprises a phase measuring unit PMU for determining a first phase of a data signal traveling on a first wavelength $\lambda 1$, and a second phase of the same data signal traveling on a second wavelength $\lambda 2$, received consecutively over the link under measurement. A dispersion measurement controller controls operation of the phase measuring unit and characterizes the dispersion of the link at a wavelength of interest $\lambda=(\lambda 1+\lambda 2)/2$, based on the first and second phases. The PMU includes a frame detector for determining a first and a second rotation signal indicative of the digital offset between the first and second test clocks with a respective frame start, and a phase detector for measuring the phase of these test clocks with respect to a static reference. The static reference is provided by the same data signal transmitted continuously over a reference wavelength. The test and reference clocks are 1:n divided to extend the range of the measurement. A method for characterizing the dispersion of a link of an optical network is also provided.

21 Claims, 5 Drawing Sheets

DISPERSION MEASUREMENT IN OPTICAL NETWORKS

FIELD OF THE INVENTION

The invention resides in the field of optical telecommunications networks, and is directed in particular to dispersion measurement in optical networks.

BACKGROUND OF THE INVENTION

Figure 1A:
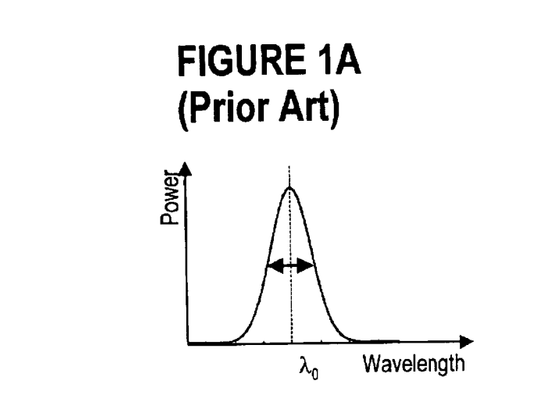

In optical transmission systems, the user traffic is carried by one or more channels traveling between a transmitter and a receiver in optical format. The receiver task is to convert the optical signal back into an electrical format and to extract the user signal. A channel is defined as a carrier wavelength modulated with a user signal. Ideally, a light pulse (representing a digital "1") is a surge of light of a certain power at wavelength $\lambda 0$; in fact, the pulse of light has a certain "width" comprised of a small range of wavelengths about the central wavelength, as shown in FIG. 1A.

The optical fibers used as the transmission medium and most optical components (optical amplifiers, filters) are dispersive, that is, different wavelengths of light travel at slightly different phase velocities $V_{ph}=\omega/k=c/n(\lambda)$, where c is the vacuum speed of light. The propagation characteristics of each wavelength depend on the effective mode index $n(\lambda)$, or the effective propagation parameter $k=2\pi n(\lambda)/\lambda$. The mode index changes with wavelength, polarization and mode profile, due to material dispersion and due to the waveguide dispersion of the confined mode. The effective mode index $n(\lambda)$ shows a non-linear wavelength dependence over an extended spectral domain. As a result, not only the phase velocity, but also the group velocity $v_g=\partial\omega/\partial k=c/[n-\lambda(dn/d\lambda)]$ changes with wavelength. The group velocity is the speed at which non-uniformities in the field intensity, such as an information-carrying modulated pulse train, move through the medium. As an initially short pulse requires some spectral width as dictated by the fundamental property of Fourier transforms, the wavelength-dependence of the group velocity tends to broaden the pulse as it propagates through the fiber, because different spectral components of the pulse travel at different velocities.

Figure 1B:
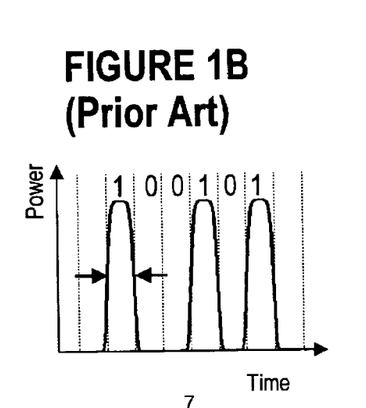
FIG. 1B shows the shape of a data signal at the input to a dispersive fiber link and FIG. 1C shows the same data at the output of the link.
Figure 1C:
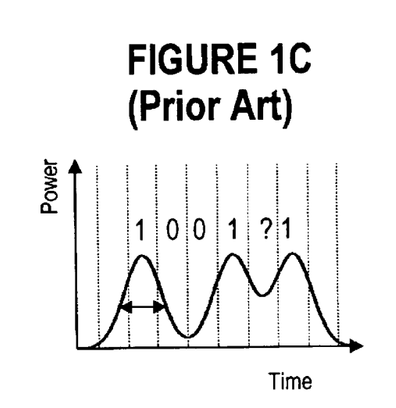

This wavelength dependency of the propagation parameter and consequently of the group velocity is termed chromatic dispersion CD, or intra-modal dispersion. FIG. 1B shows a signal '100101' at the input of an optical link, and FIG. 1C illustrates how the light pulses representing '1's widen as the signal travels down the fiber. As a result, the pulse energy of symbols "1" spreads into the neighboring symbols "0" (ISI or intersymbol interference), so that the receiver could interpret the signal correctly as '100101', or erroneously as '100111'.

It is evident that reconstructing the user signal from the received optical pulses can pose problems, especially in WDM (wavelength division multiplexed) systems, where a plurality of channels travels over the same link.

The chromatic dispersion parameter $D(\lambda)$ is defined as:

$$D(\lambda) = \frac{\partial \tau}{\partial \lambda} \cdot \frac{1}{L} \qquad \text{EQ 1}$$

where $\partial\tau$ is the differential group delay (DGD) of two pulses, i.e. the variation of the travel time (in picoseconds) from the transmitter to the point of measurement, $\partial\lambda$ is the differential spectral separation of the two carrier wavelengths (in nanometers) and L is the length of the fiber (in kilometers) over which the dispersion is measured. The target dispersion for a fiber link is defined as:

$$D_T(\lambda)=D(\lambda)\cdot L \qquad \text{EQ2}$$

For example, for every km of fiber traveled through, two pulses with a 1 nm initial separation of wavelengths will experience a differential group delay of 1 ps, if the dispersion parameter of the fiber is 1 ps/(nm km). Similarly, the two outlying spectral components of a 10 Gb/s pulse with a 0.2 nm spectral width will widen by a whole bit period (100 ps) after some propagation distance, and will then cause bit errors by spreading the pulse energy into the neighboring symbol.

Since the dispersion parameter D is wavelength-dependent, another parameter is defined to characterize dispersion, namely the dispersion slope, given by:

$$S=\partial D/\partial\lambda \qquad \text{EQ3}$$

If we assume a linear dispersion dependence on wavelength in some interval $\Delta\lambda$, the slope can be expressed as the ratio of change in the dispersion to the change in the wavelength $\Delta D/\Delta\lambda$ calculated with respect to a reference wavelength.

Chromatic dispersion can be corrected, or "compensated," through the use of specially designed optical components (such as fibers, Bragg gratings) inserted at given locations along the transmission path. For a comprehensive compensation, the total dispersion of the compensating component (which could be packaged e.g. as a dispersion compensating module DCM) must have the same value, but opposite sign to the dispersion of the preceding transmission section, which is obtained if the dispersion is $-D_T(\lambda)$, namely $$D_{DCM}\cdot L_{DCM\ fiber}=-D_{fiber\ section}\cdot L_{fiber\ section}. \qquad \text{EQ4}$$

With the data rates of optical communication systems increasing through techniques such as dense WDM (DWDM), and network reach increasing through techniques known as ultra long reach (ULR), determination of chromatic dispersion of the fiber and optical components within the systems becomes increasingly important, but also more difficult. Thus, dispersion of each transmission section needs to be determined with as much accuracy as possible to provide accurate compensation, for achieving longer un-regenerated reach and ultimately a less expensive network.

Accurate link dispersion values are particularly useful in wavelength switched network. In these networks, end-to-end physical routes (paths) are dynamically set-up and removed arbitrarily (based on users' requests), without interruption of the co-propagating traffic. Agility requires accurate knowledge of the link parameters, since matching an end-to-end path to a connection request is based, among other rules, on individual link/path performance. The chances of setting-up a connection along a path increase (and the time-to-service decreases) if the selection process uses accurate path performance parameters, which include end-to-end (link) dispersion.

Fiber cable manufacturers provide chromatic dispersion parameters by wavelength windows for each fiber cable type. Also, most device specifications include CD information. A simple way to determine the total dispersion over a link is to multiply the dispersion coefficient for a certain type of fiber by the fiber length in km and to add to this the specified dispersion of the optical components connected in the respective link.

This method is often used in current point-to-point networks, where each span/link is provisioned based on estimated data, using in addition generous engineering margins to ensure that the span/link will successfully carry the traffic over the specified distance. This is clearly not the best way of using network resources. In addition, in many cases the fiber type is not known; there are no reliable methods to detect the type of the fiber buried in early days of the optical networking. Also, this method assumes a uniform dispersion along the entire fiber cable length, which is not generally true. While this assumption can be used in systems with a small channel-count and short links, it is not satisfactory for wavelength switched DWDM (dense WDM) systems.

A more accurate value of dispersion is evidently obtained by measuring the dispersion. Chromatic dispersion can be determined by performing time domain measurements and frequency domain measurements, as described for example by P. J Dean in "Optical Fiber Communications, Principles and Practice", published in 1985 by Prentice-Hall International, Inc, London, pages 196–202.

However, current dispersion measurement methods cannot be readily used in wavelength switched (agile) networks, for at least the following reasons.

The current networks have a point-to-point architecture that uses span equalization, so that the existing dispersion measuring methods can provide accurate dispersion measurements for a span, which is a relatively short length of fiber (100–150 km) and does not include optical amplifiers.

In agile switched networks, a channel travels for much longer distances in optical format (without regeneration) than in point-to-point networks, passing through a plurality of optical amplifiers and intermediate switching nodes and/or optical add/drop nodes. The current dispersion measuring methods are not suitable for links with multiple optical amplifiers since the amplified spontaneous emission (ASE) accumulated along the link reduces the received signal-to-noise ratio and may introduce severe measurement errors.

As well, the current dispersion measurement methods may not be able to cope with the bandwidth-limiting effects introduced by spectral filters in end-to end links.

Some traditional dispersion measurement methods require bi-directional transmission. An optical amplifier however, contains optical isolators prohibiting bidirectional transmission of probe or reference signals.

Still further, the traditional dispersion measurement methods require special test equipment.

There is a need to provide a method for measuring dispersion of an end-to-end link of an optical network that is reliable, inexpensive and uses standard agile network equipment.

SUMMARY OF THE INVENTION

It is an object of the invention to provide a reliable and inexpensive method of measuring dispersion in a wavelength division multiplexed (WDM) network, or/and a dense WDM (DWDM) network.

Accordingly, the invention is directed to a device for measuring dispersion of a link between two switching nodes of an optical network comprising: a phase measuring unit for determining a first phase of a data signal received over the link on a first wavelength $\lambda 1$ and a second phase of the data signal received over the link on a second wavelength $\lambda 2$; and a dispersion measurement controller for controlling operation of the phase measuring unit, and characterizing the dispersion of the link at a wavelength of interest $\lambda=(\lambda 1+\lambda 2)/2$ based on the first and second phases.

According to another aspect, the invention provides a method for characterizing the dispersion of a link of an optical network comprising:

(a) transmitting over the link a data signal over a first test wavelength $\lambda 1$ and thereafter over a second test wavelength $\lambda 2$; (b) at the output of the link, measuring a first phase of the data signal received on the first wavelength $\lambda 1$ and a second phase of the data signal received on the second wavelength $\lambda 2$; and (c) characterizing the dispersion of the link at a wavelength of interest $\lambda=(\lambda 1+\lambda 2)/2$ based on the difference between the first and second phases . . . .

The measured values for dispersion of each link provided by the invention can be advantageously used to optimize network operation. Knowing the link dispersion allows to accurately select the fixed dispersion compensating modules DCMs and to adjust the tunable DCMs such that the network reach is optimized for each connection. Thus, measuring dispersion at each amplifier site or across multiple fiber spans, allows selection of appropriate fixed span DCMs to accurately compensate the span dispersion. The fixed DCMs may be selected in an open loop; semi-automated closed loop testing can be performed where software selected DCMs are replaced until the target is achieved. Full closed loop adjustment of tunable DCMs (when available) to the link target value can be performed at the switching nodes to accurately compensate for the residual link dispersion. Furthermore, the measured link dispersion helps in selecting the power targets for each wavelength. As well, the measured link dispersion can be stored in a database to provide the dispersion values for post dispersion compensation.

Still further, the dispersion measurement of the invention can be used in agile networks to automate recording of span, link or path dispersion, which in turn can be used by the routing mechanism.

The dispersion measurement unit may use installed network equipment or may be implemented on a dispersion measurement card, that can be temporarily inserted in a shelf at remote sites, or a portable test set may be used.

In addition, the method according to the invention uses standard agile network equipment, resulting in less costly and faster measurements.

BRIEF DESCRIPTION OF THE DRAWINGS

The foregoing and other objects, features and advantages of the invention will be apparent from the following more particular description of the preferred embodiments, as illustrated in the appended drawings, where:

FIGS. 1A, 1B and 1C show chromatic dispersion, where FIG. A shows the spectral width of a channel.

DETAILED DESCRIPTION OF THE PREFERRED EMBODIMENTS

As discussed in the background section, FIGS. 1A–1C show the chromatic dispersion phenomenon. FIG. 1A illustrates the spectral width of a channel $\lambda_0$. FIG. 1B shows a signal '100101' at the input of an optical link. As the signal travels along a dispersive link, the pulse energy of symbols "1" spreads into the neighboring symbols "0". As a result, the receiver at the end of the link can decode the distorted signal shown in FIG. 1C correctly as '100101', or erroneously as '100111'.

Figure 2A:
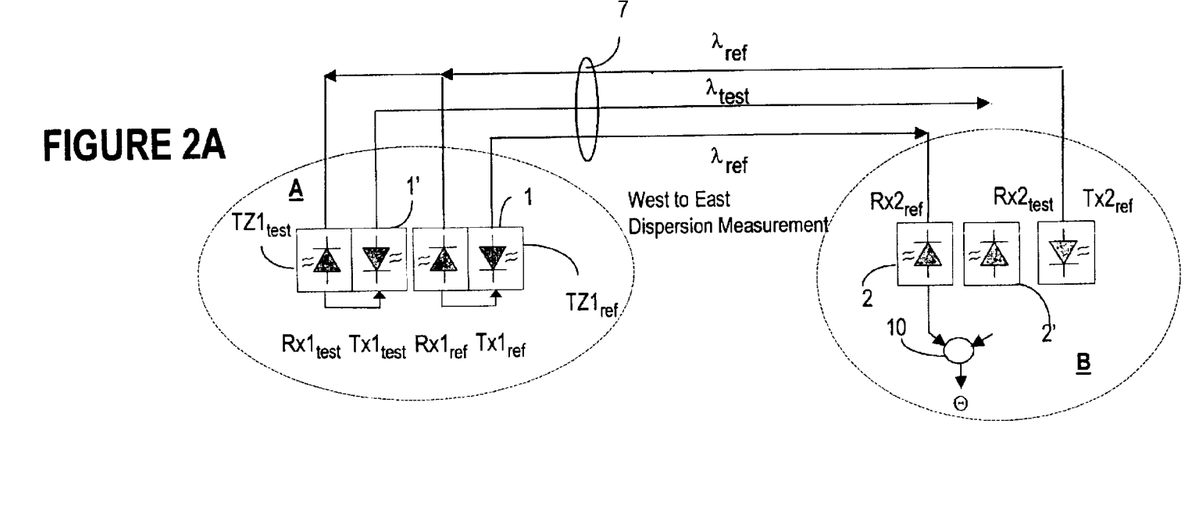
FIG. 2A shows an arrangement for on-line link dispersion measurement, illustrating how a synchronous source signal may be generated.

FIG. 2A is a block diagram of a transport link between nodes A and B of a WDM network, showing how the source signal can be obtained using equipment already installed in the network. In this example, node A comprises transceivers (a transmitter-receiver pair) $Tz1_{ref}$ and $Tz1_{test}$ and node B includes transceivers $Tz2_{ref}$ and $Tz2_{test}$. A transceiver may operate in a regenerator mode, when the frequency and data pattern of the transmitted signal are the same as that of the received signal, or may operate in a "free run" mode, when the transmitted signal is generated by a local clock reference and a data pattern generator.

It is to be noted that the switching nodes and OADM (optical add/drop multiplexing) nodes of an agile network are equipped with a pool of transceivers, including transceivers that are idle at a certain time for allowing dynamic set-up and tear-down of network connections in response to users calls, for regenerating under-performing channels, or for converting the wavelength of an incoming channel to avoid channel collisions. These transceivers may be used to measure dispersion according to the invention. Alternatively, rather than using installed network equipment, the dispersion measuring arrangement shown in FIG. 2A may be implemented on a dispersion measurement card, that can be temporarily inserted in a shelf at remote sites, or a portable test set may be used. Such a solution may be used in any optical network.

To obtain a synchronous source signal for dispersion measurement, one of the unused transmitters of the reference or test transceivers $Tz2_{ref}$, $Tz2_{test}$ at node B transmits to node A a data signal modulated over a reference channel of a wavelength $\lambda_{ref}$. The data signal is preferably a random data pattern, which may be for example an AIS signal (alarm information signal). Transceiver $Tz1_{ref}$ operates in a regenerator mode, so that transmitter 1 modulates the data signal recovered by $Rx1_{ref}$ over the reference wavelength $\lambda_{ref}$, to generate the reference signal. Transceiver $Tz1_{test}$ operates as a wavelength converter, so that transmitter 1' modulates the same data signal recovered by $Rx1_{test}$ over a test wavelength $\lambda_{test}$ to generate a test signal. Other arrangements may be used to obtain a synchronized source data signal, the arrangement shown in FIG. 2A is preferred in that it uses network equipment already installed at the nodes of interest.

Both the reference and test signal travel from node A to node B along the same link 7, where the reference and test signals are detected. Thus, a respective receiver $Rx2_{ref}$, $Rx2_{test}$ detects the input data signal from the respective channel; the detected signals are synchronized, as they have the same source. The test wavelength is then changed from a first wavelength $\lambda 1$ to a second wavelength $\lambda 2$, and link dispersion is calculated for a wavelength $\lambda=(\lambda 1+\lambda 2)/2$, using the phases measured for the two test wavelengths with respect to the reference wavelength. In this way, distortion at any wavelength of interest may be obtained by selecting $\lambda 1$ and $\lambda 2$ as needed.

Figure 2B:
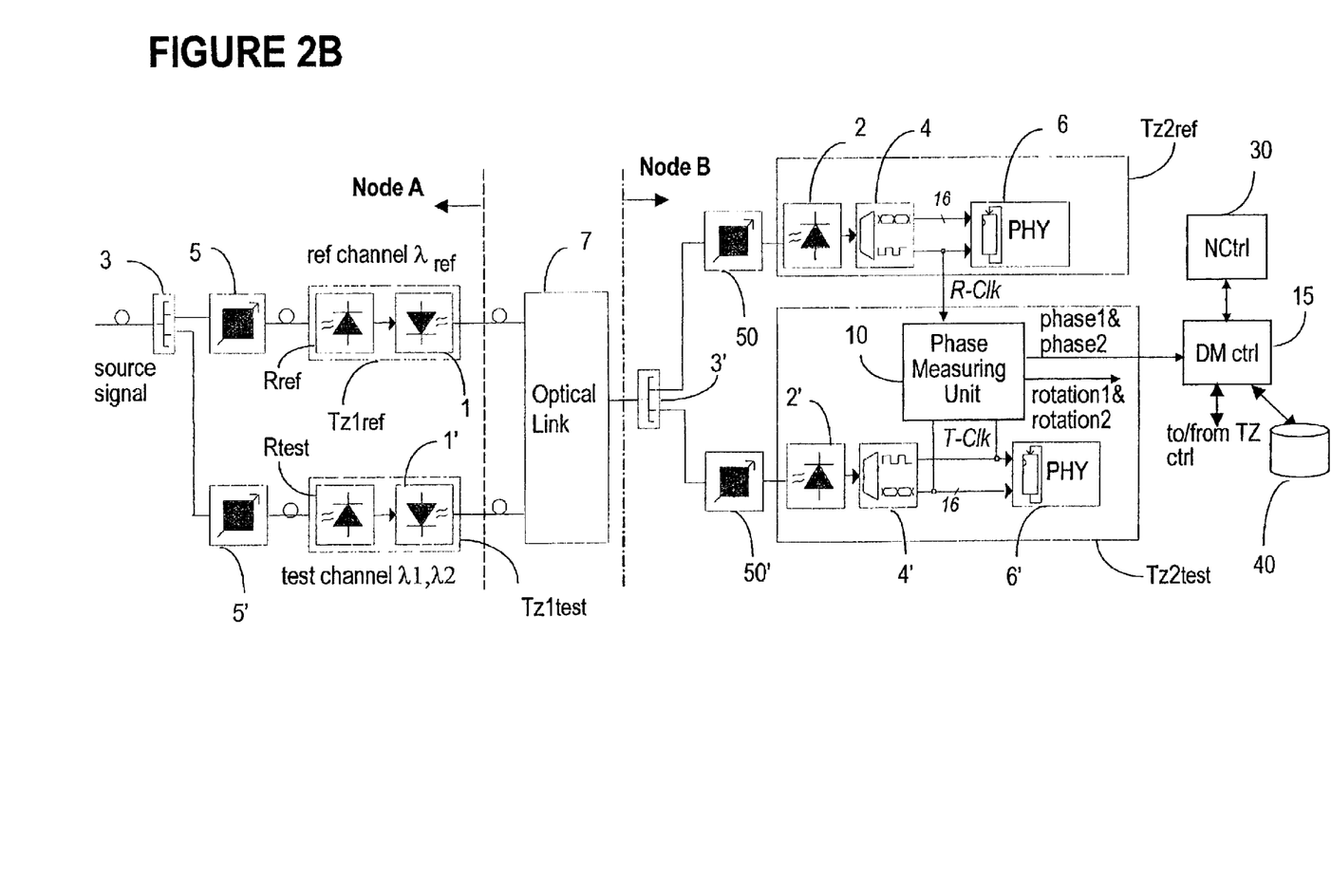
FIG. 2B is a block diagram of a transport link including the dispersion measurement unit according to an embodiment of the invention.

FIG. 2B shows the same arrangement according to an embodiment of the invention in more details, while omitting the reverse connection for obtaining the source signal for simplicity. At node A, the source signal is split at the input of transceivers $Tz1_{ref}$ and $Tz1_{test}$ into two optical fractions by an optical splitter 3, followed by a respective tunable filter 5, 5', which filters-out any other wavelength than $\lambda_{ref}$. As indicated above, this is necessary to ensure that the data signals are synchronous at source. Transmitter 1 of the first reference transceiver $Tz1_{ref}$ regenerates the source data signal of $\lambda_{ref}$ and transmits it across optical link 7. Transmitter 1' of the first test transceiver $Tz1_{test}$ regenerates a first test signal and transmits it across the same optical link 7 using wavelength $\lambda 1$.

Figure 5:
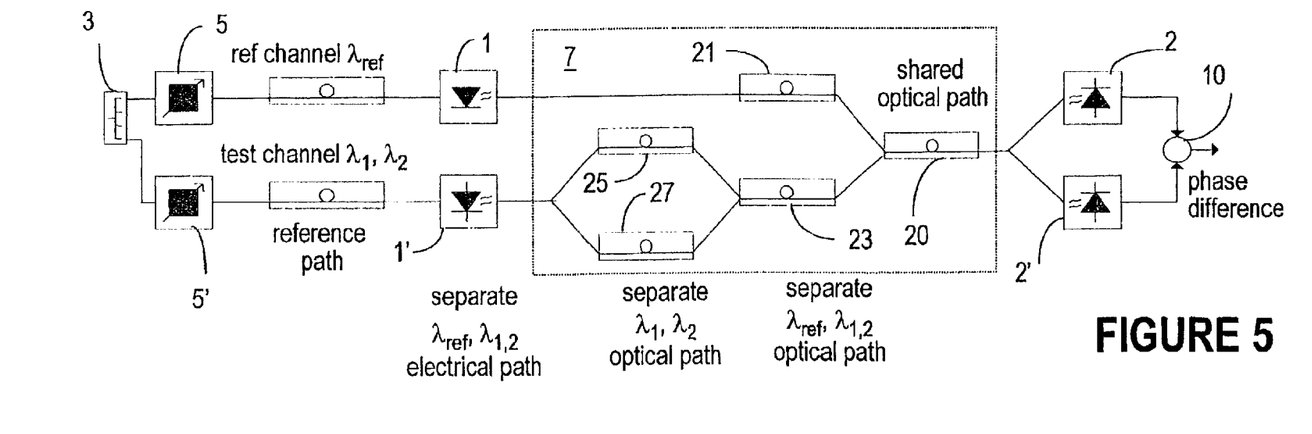
FIG. 5 illustrates a transmission link with the dispersive components grouped according to their contribution to dispersion measurement.

The optical link that connects nodes A and B in is shown this example as a block 7 with two inputs and one output. This representation was used to intuitively show that the end-to-end routes $Tz1_{ref}$-$Tz2_{ref}$ and $Tz1_{test}$-$Tz2_{test}$ are slightly different, as described later in connection with FIG. 5. Link 7 includes a plurality of active optical components such as optical amplifiers, tunable filters, wavelength selectors/blockers, and passive optical components such as fiber, splitters, connectors, etc. Since most of these components are dispersive, link 7 introduces a different dispersion in each data signal, according to the wavelength of the channel carrying the data signal.

At the output of optical link 7, the optical signals $\lambda_{ref}$ and $\lambda_1$ are separated using a splitter 3' followed by tunable filters 50 and respectively 50', for extracting the respective channel at the input of the corresponding transceivers $Tz2_{ref}$ and $Tz2_{test}$. Detectors 2 and 2' of the respective receiver $Rx2_{ref}$ and $Rx2_{test}$ convert the reference and test optical signals to an electrical format, to recover the respective data signals. The data signals carried by the two test channels suffer different dispersion impairments along link 7, because the optical carriers have a different wavelength and also because they pass through slightly different dispersive components. In addition, as the test wavelengths are not transmitted at the same time, determination of the phase difference between the two data signals traveling along wavelengths $\lambda 1$ and $\lambda 2$ must take into account this time lag as well.

As a result, the data on the reference and test channels will arrive at the end of link 7 with a different phase that depends on (a) the carrier wavelength $\lambda 1$ and $\lambda 2$, (b) the moment of change from $\lambda 1$ to $\lambda 2$ and (c) the differences in the route of the two data signals. Only the dependence on the channel wavelength (a) is relevant for determining link dispersion; the method according to the invention provides a way to compensating the inaccuracies introduced into the measurements by (b) and (c). Thus, the path variation (c) is compensated for by using measurements at two test wavelengths and averaging the results, as described later in connection with FIG. 5. The measurement inaccuracy at (b) is accounted for by using a reference signal that is synchronous with the test signals and maintains its phase when the test wavelength changes, as described next.

The receivers generally include a demultiplexing stage (serial to parallel converter), shown by block 4 and 4', which recover the respective reference clock R-Clk and test clock T-Clk, and separate 'n' bits of data (n-bit data words). For example n=16, and the data at the output of demultiplexer 4 is formatted into 16-bit words. While the clocks have the same frequency, they will have a phase offset due to the dispersion dependence of the optical carrier wavelength.

The data words are input to a respective physical layer processing circuit PHY 6, 6'. PHY circuit 6, 6' is responsible for example with de-framing of the data, stripping the overhead information, and other operations specific to the line format. Stage 4, 4' and circuit 6, 6' are generally provided at an optical receiver for data formatting and processing.

FIG. 2B also shows a phase measuring (PM) unit 10 coupled at node B according to an embodiment of the invention. Dispersion measurement for forward (West to East) traffic is considered; it is to be noted that similar operations and equipment may be used for measuring dispersion on the reverse links. Also, phase measurement unit 10 is shown at the transceiver $Tz2_{test}$; however unit 10 could be connected at $Tz2_{ref}$ or could be a separate device. It is also to be noted that FIG. 2B only shows the receive side of transceivers $Tz2_{ref}$ and $Tz2_{test}$, which are relevant to the invention.

As indicated above, since continuity of the data signal received over the test channels is interrupted when switching test wavelength $\lambda 1$ to $\lambda 2$, a static reference is needed to compare the phases of these signals, which reference is provided by the data signal received over the reference channel.

The two clocks R-Clk and T-Clk extracted from the reference and test data are 1:n divided in phase measuring unit 10, and then phase-compared to obtain a first phase phase1 signal ($\theta$). Phase measuring unit 10 also provides rotation information, as shown by signal 'rotation1'. The rotation 1 signal provides the number of rotations of the 16 bit data for obtaining alignment with the start of the frame. A new phase phase2 and rotation 'rotation2' are measured with phase measuring unit 10 when the test channel wavelength $\lambda 1$ is then changed to $\lambda 2$.

Demultiplexing, as shown by demultiplexers 4, 4', with clock division and rotation detection add range to the phase detector and provide a means for phase detector calibration in service. Alternate means of detecting pattern shifts are available to digitally extend the range of the phase detector.

Figure 3:
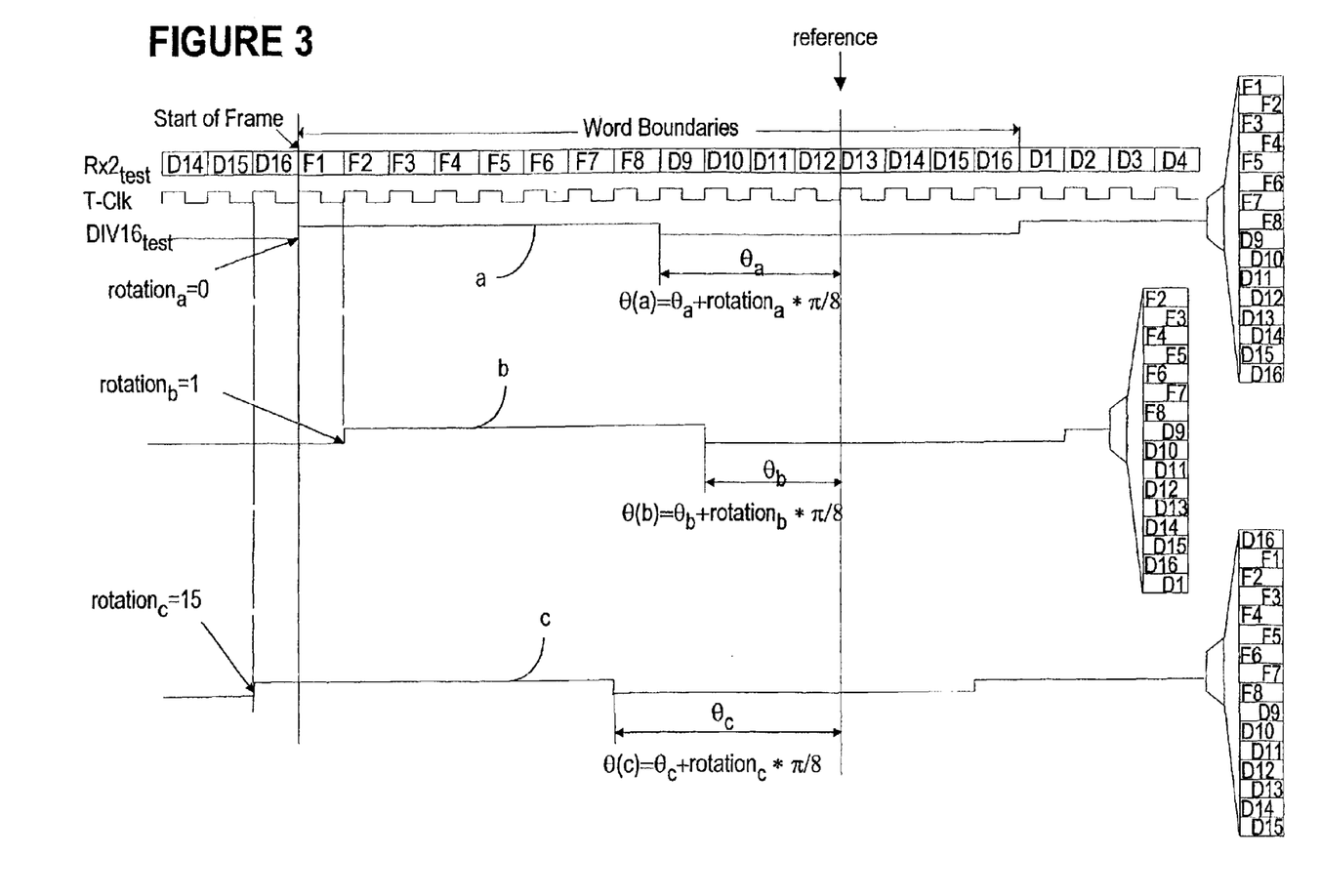
FIG. 3 illustrates frame and word rotation with demultiplexing.

FIG. 3 shows the rotation of a 16-bit word for three different phases of the respective 1:n clock. Note that 'n' may have other values, however the number 'n' of bits in the demultiplexed data signal is related to the divisor of the clock. In other words, for a 16-bit word, the clock is preferably divided by 16, but it could be divided by e.g. a multiple of 16 for increasing the range of the measurement.

The static (fixed) reference is shown at 50. The phase $\theta$ of the DIV $16_{test}$ clock is given by:

$$\theta = \theta_{rel} + \text{rotation} \cdot 2\pi/n \qquad \text{EQ5}$$

where $\theta_{rel}$ is the phase of the respective data signal relative to the fixed reference 50. The rotation signal provides the digital value of the phase (i.e. by how many bits the frame of the signal is shifted with respect to the positive edge of the clock). This is detected by PM unit 10 or PHY 6' which determines the rotation state of demultiplexer 4, 4'. FIG. 3 shows examples of clock-data offsets. The clock shown at (a) is in phase with the start of the frame (digit F1), so that in this case $\text{rotation}_a = 0$, and $\theta$ (a)=$\theta_a$. The clock shown at (b) is out of phase by $2\pi/n = \pi/8$, being aligned with F2, so that in this case $\text{rotation}_b = 1$, and the data needs one rotation to align F1 with clock (b). In this example, $\theta$ (b)=$\theta_b + \pi/8$. Finally, the clock shown at (c) is out of phase by $-\pi/8$, being aligned with D16, so that in this case $\text{rotation}_b = 15$, as the data needs 15 rotations to align the start of frame F1 with clock (c). In this example, $\theta$ (c)=$\theta_c + 15\pi/8$.

It is apparent that a 4-bit of word rotation allows measurement of group delay changes across a full 1:16 clock period. The divided clock phase and word rotation are coupled.

Returning to the operation of PM unit 10, the phase1 and phase2 signals together with the respective 'rotation1' and 'rotation2' measured for the two test channels are provided to a dispersion measurement DM controller 15, which calculates $\text{phase}_{13}1$ and $\text{phase}_{13}2$ relative to the fixed reference point.

$$\text{phase\_1} = phase1 + \frac{\pi}{8} \times rotation1 \qquad \text{EQ 5'}$$

$$\text{phase\_2} = phase2 + \frac{\pi}{8} \times rotation2$$

Returning to FIG. 2B, DM controller 15 processes these phase signals to determine the dispersion parameter at a wavelength $\lambda = (\lambda 1 + \lambda 2)/2$, as shown by EQ6:

$$D(\lambda) = \frac{(\text{phase\_2} - \text{phase\_1}) \cdot T_B}{2\pi \cdot (\lambda 2 - \lambda 1)} \cdot \frac{1}{L} \qquad \text{EQ 6}$$

where $T_B$ is the bit period.

Still further, DM controller 15 calculates the dispersion slope and measurement uncertainty. After the first measurement, dispersion is known as a fixed plus an unknown value $D + \Delta D$. $\Delta D$ is a function of phase and wavelength uncertainty, which can be reduced and the range of the phase detector extended by progressive measurements with increasing $\Delta \lambda$.

FIG. 2B also shows a network controller NC 30, which is present at each switching or OADM node of an agile network. Network controller 30 provides the type of connection at the node (passthrough, or add/drop), assigns a transmitter/receiver to a connection and configuring the access structure accordingly, and accomplishes the lightpath setup based on current topology and loading data from a topology database (not shown). Network controller 30 also collects performance data from the line system, as shown by database 40. These operations may be performed by DM controller 15, if the network is not provided with a network controller such as NC 30.

DM controller 15 may also be used for post-calculation activities, such as to compare the calculated dispersion against a dispersion target and to recommend fixed dispersion values for the DCM (dispersion compensation modules) provided generally along a transmission link. If a tunable DCM (a TDC) is available at the destination node (here node B), controller 15 sets it at a mid-point, selects a fixed DCM to bring the adjustment into the range and then adjusts the TDC in a closed loop until the dispersion target is achieved. DM controller 15 also adapts the dispersion data to a format suitable for transmission and storage into the performance database 40 for use by various entities involved in path selection and set-up.

DM controller 15 coordinates various connection control entities present at the network controller 30 and phase measuring unit 10 to perform the measurement. Thus, for example it instructs network controller 30 to set-up the test and reference connections for the transceivers involved in the measurement and configures the transceivers to operate in an source signal generation mode or regeneration mode. DM controller 15 also initiates the measurement, by instructing the reference and the test transceivers to perform phase difference measurements for various wavelengths $\lambda$, sets the wavelength increments for all measurements repeating the measurements for a certain number of wavelength paths.

DM controller 15 also configures the transceiver in 'source signal generation mode' or 'regenerator mode'. In source signal generation mode, the transmitter of the respective transceiver generates the source signal, which could be for example an AIS signal. It is to be noted that other source signals may be used. Controller 15 also adjusts the laser of the transmitter to select a certain wavelength for the reference or test signal.

Figure 4:
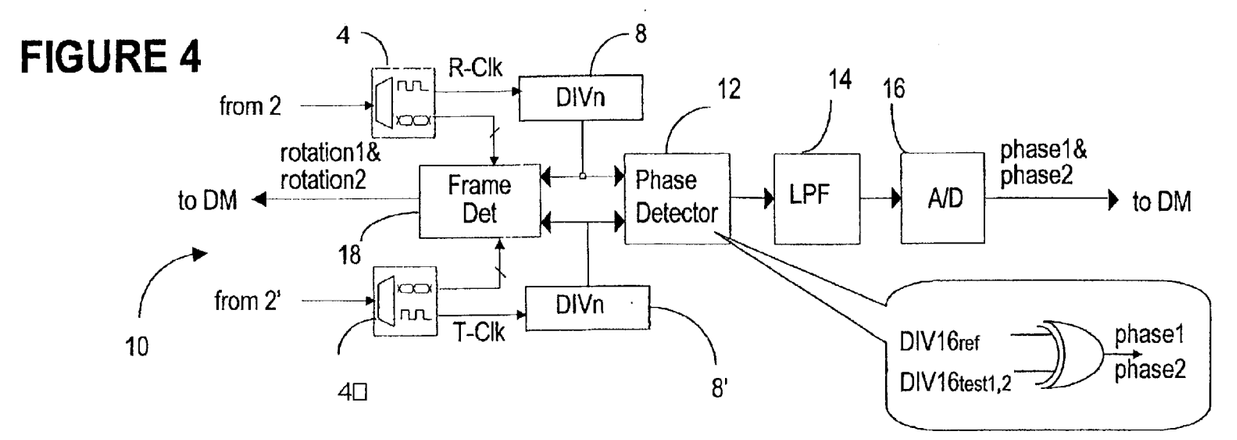
FIG. 4 shows an embodiment of the phase measurement unit of FIG. 2A.

FIG. 4 shows an embodiment of the phase measuring unit 10. As indicated in connection with FIG. 2B, each clock R-Clk and T-Clk extracted from the respective reference and test data signal is 1:n divided for increasing the range of the measurement. This is performed in DIVn circuits 8 and respectively 8', which provide a respective DIV16$_{ref}$ and DIV16$_{test}$ clock (in this example n=16).

A phase detector 12 determines the phase of the DIV16$_{test}$ clocks with respect to a static reference 50 and provides the phase1 and phase2 signals by effecting the measurements for two test wavelengths λ1 and λ2. Phase detector 12 could be an EX-OR (exclusive OR) circuit, as shown in the insert.

A low pass filter 14 and an analog-to-digital converter 16 are used to process the phase difference signals by formatting the output of comparator 12 into a data signal.

Phase measurement unit 10 also includes a frame-detecting unit 18, which detects when the receiver is locked on the frame of the received signal to measure the rotation signal using the correlation between the data demultiplexed by serial-to-parallel converter 4, 4' and the respective divided clock. Thus, frame detecting unit 18 reads the output of the A/D detector 16 'n' times in a row, with a spacing of M msec (rotation signal) and sends the values to the DM controller 15.

It is to be noted that physical layer processing unit 6' may perform the functionality of unit 18, if an of-shelf unit 6' equipped with frame rotation capabilities is used in the transceivers.

Variations in path group delay can be divided into static, noise and drift.

Static variations are caused by propagation of the channels along slightly different paths. As indicated previously, the path of each channel is slightly different in the nodes access structure, namely the dispersive optical components of the add structure at node A and of the drop structure at node B. Thus, the dispersive components of link 7 that are not passed through by both the reference and test signals are shown intuitively by blocks 21 and 23 on FIG. 5. Such components may include for example the optical amplifiers and blockers connected in the way of the add signal from the transmitter to the output multiplexer.

Therefore, by using the difference between two test signals relative to a stationary reference, the reference path delay is eliminated from the measurement.

The differences in the components in the path of channels λ1 and λ2 are in the drop structure, where even if the physical paths are eventually the same, most of the components, such as the amplifiers, blockers and the tunable filter have a wavelength dependent characteristic, so that the delay experienced by the channels is different. This is shown by blocks 25 and 27 on FIG. 5. It is to be noted that these components were grouped as blocks 25, 27 even if they may be physically connected at the output of node A and input of node B. Calibration of these differences with a loop-back test can be used to eliminate this error. The phase detector can be calibrated for various add/drop structures, as shown in FIG. 6.

Figure 6:
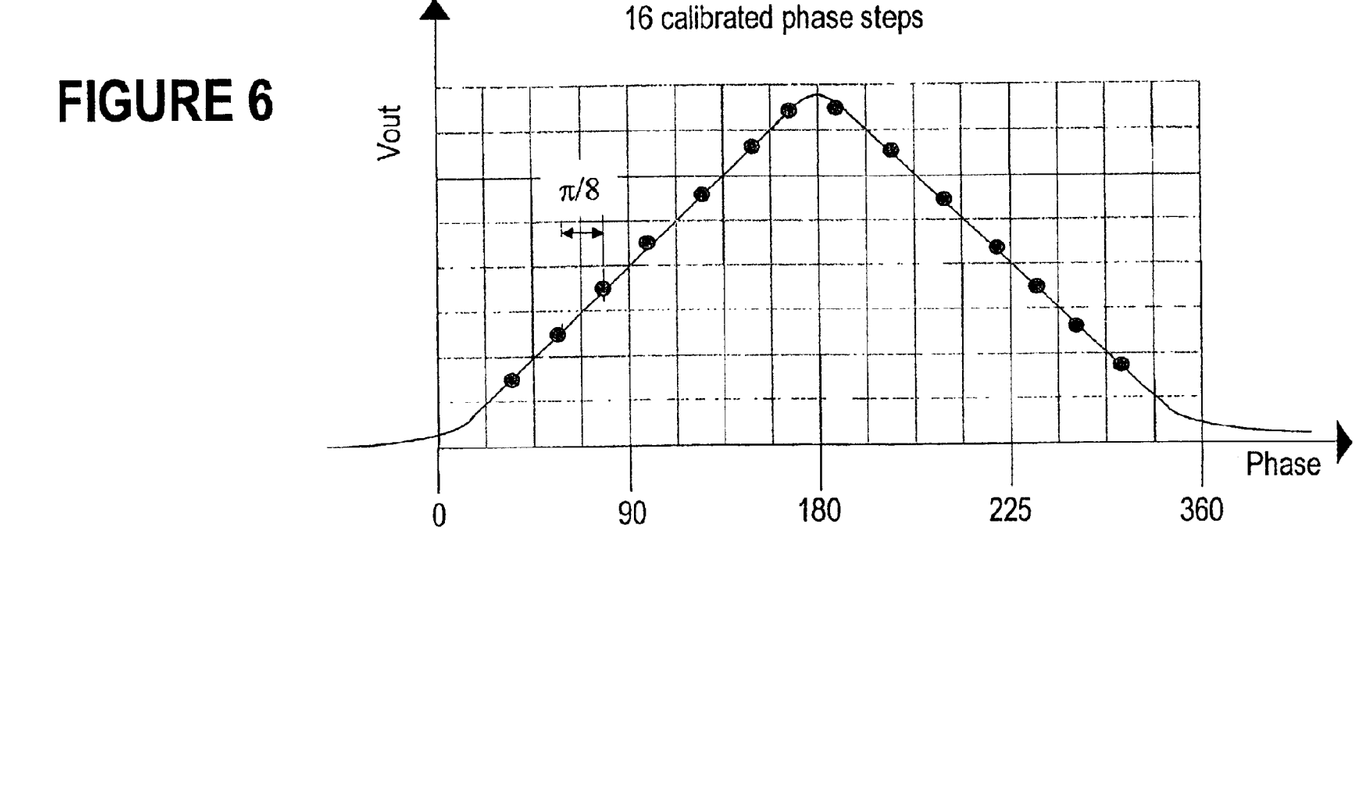
FIG. 6 is graph showing the calibration of the phase detector of the dispersion measurement arrangement.

The graph of FIG. 6 shows calibration of the phase detector for all 16 phases of a clock. The graph is obtained by making multiple measurements of the same system state, separated by signal interruptions. The calibration data, along with the dispersion measurements, may be stored as shown generically at 40 on FIG. 2B.

Measurement averaging and filtering compensates for noise variations. A portion of the PMD (polarization mode dispersion) is filtered as noise. Effects not eliminated by noise filtering are referred to as drift. Reducing the measurement interval reduces drift error. Averaging of the results of short interval measurements can further reduce non-systematic drift error.

As indicated above, transceivers Tz1$_{ref}$, Tz1$_{test}$, Tz2$_{ref}$ and Tz2$_{test}$ may be network transceivers available at the respective nodes. In this case Tz2$_{ref}$ or Tz2$_{test}$ may be provided with unit 10 and unit 15 may be provided in the node controller 30. The measurement can be effected on or off-line; in the case of on-line measurements, the transceivers do not carry live traffic at the time of dispersion measurement.

Alternatively, Tz1$_{ref}$, Tz1$_{test}$, Tz2$_{ref}$ and Tz2$_{test}$ along with units 10 and 15 may be provided on a separate card, which may be provided at certain nodes, or moved from node to node to effect off-line measurements.

We claim:

1. A device for measuring dispersion of a link between two switching nodes of an optical network comprising:
   a phase measuring unit for determining a first phase of a data signal received over said link on a first wavelength λ1 and a second phase of said data signal received over said link on a second wavelength λ2; and
   a dispersion measurement controller for controlling operation of said phase measuring unit, and determining the dispersion of said link at a wavelength of interest λ=(λ1+λ2)/2 based on said first and second phases.

2. A device as claimed in claim 1, wherein said phase measuring unit comprises:
   a test dividing circuit for dividing a first and a second test clock extracted from said data signal received on said first and second wavelength, respectively, and providing a first and a second divided test clock;
   means for determining a first and a second rotation signal indicative of the digital offset between said first and second divided test clocks with a respective frame start; and
   a phase detector for measuring the phase of said first and second divided test clock with respect to a static reference to obtain said first and said second phases.

3. A device as claimed in claim 2 further comprising a reference dividing circuit for dividing a reference clock extracted from said data signal received on a reference wavelength and providing a divided reference clock, wherein said static reference is provided by said divided reference clock.

4. A device as claimed in claim 2, wherein said means for determining is a frame detector.

5. A device as claimed in claim 2, wherein said phase measuring unit further comprises an analog-to-digital converter for providing said first and said second phases to said dispersion measurement controller in a digital format.

6. A device as claimed in claim 3, further comprising:
   a reference receiver for detecting said data signal received on said reference wavelength and extracting said reference clock;
   a test receiver for detecting said data signal received on said first and second test wavelengths and extracting said first and second test clocks; and
   a dispersion measuring card for accommodating said phase measuring unit and said receivers,
   wherein each said receiver is provided with means for serial-to-parallel converting said data signal and providing same to said means for determining.

7. A device as claimed in claim 6, further comprising, on said card, a reference transmitter for modulating said data signal received over said reference wavelength and transmitting same to the node at the input of said link.

8. A device as claimed in claim 1, further comprising a memory for storing dispersion calibration data for said phase measuring unit.

9. A device as claimed in claim 8, wherein said memory further stores dispersion data calculated for said link.

10. A method for characterizing the dispersion of a link of an optical network comprising:
   (a) transmitting over said link a data signal over a first test wavelength $\lambda 1$ and thereafter over a second test wavelength $\lambda 2$;
   (b) at the output of said link, measuring a first phase of said data signal received on said first wavelength $\lambda 1$ and a second phase of said data signal received on said second wavelength $\lambda 2$; and
   (c) determining the dispersion of said link at a wavelength of interest $\lambda=(\lambda 1+\lambda 2)/2$ based on the difference between said first and second phases.

11. A method as claimed in claim 10 wherein said step (b) comprises:
   dividing a first and a second test clock extracted from said data signal received on said first and second test wavelengths, and providing a first and a second divided test clocks; and
   comparing the phase of said first and second divided test clocks with a static reference to obtain said first and said second phases.

12. A method as claimed in claim 11, further comprising determining a first and a second rotation signal indicative of the time offset between said data signal received over said respective first and second wavelength.

13. A method as claimed in claim 12, wherein step of determining a first and a second rotation signal comprises:
   serial-to-parallel converting said data signal received over said respective first and second wavelength to obtain a respective test word;
   determining said first and said second rotation signal as the digital offset between said respective first and second divided test clock and the respective frame start.

14. A method as claimed in claim 11, wherein said static reference is provided by said data signal received on a reference wavelength $\lambda$ref, transmitted continuously over said link and synchronous with said $\lambda 1$ and $\lambda 2$.

15. A method as claimed in claim 11, wherein said step (c) comprises:
   determining, from said first phase and said first rotation signal, a phase signal phase_1, indicative of the phase of said data signal when carried by said first test wavelength; and
   determining, from said second phase and said second rotation signal, a phase signal phase_2, indicative of the phase of said data signal when carried by said second test wavelength.

16. A method as claimed in claim 15, further comprising calculating the dispersion parameter for said link at said wavelength $\lambda$ as:

$$D(\lambda) = \frac{(\text{phase\_2} - \text{phase\_1})}{\lambda 2 - \lambda 1} \cdot \frac{1}{L},$$

wherein L is the length of said link.

17. A method as claimed in claim 16, further comprising calculating the dispersion slope $S(\lambda)$.

18. A method as claimed in claim 10, further comprising repeating steps (a) to (c) for a plurality of first and second wavelengths pairs for determining the dispersion parameter and slope across the entire spectrum used in said network to obtain a link dispersion profile.

19. A method as claimed in claim 18, further comprising storing said dispersion profile in a database.

20. A method as claimed in claim 18, further comprising using said link dispersion profile for optimizing dispersion of said link.

21. A method as claimed in claim 18, further comprising repeating steps (a) to (c) by switching between said first and second wavelengths to obtain a plurality of measurements for all phases of said test clock, to calibrate the dispersion measurements for a particular configuration of said link.

* * * * *